US008528192B2

(12) United States Patent
Jayko et al.

(10) Patent No.: US 8,528,192 B2
(45) Date of Patent: Sep. 10, 2013

(54) FIXTURE FOR REMOVING SLIP RINGS FROM ROTATING ELECTRICAL MACHINERY

(75) Inventors: Timothy W. Jayko, Schenectady, NY (US); Michael G. McClure, Albany, NY (US)

(73) Assignee: General Electric Company, Schenectady, NY (US)

( * ) Notice: Subject to any disclaimer, the term of this patent is extended or adjusted under 35 U.S.C. 154(b) by 664 days.

(21) Appl. No.: 12/164,166

(22) Filed: Jun. 30, 2008

(65) Prior Publication Data

US 2009/0320279 A1     Dec. 31, 2009

(51) Int. Cl.
*B23P 19/00*     (2006.01)

(52) U.S. Cl.
USPC .................... 29/732; 29/735; 29/597; 29/596

(58) Field of Classification Search
USPC ........... 29/729, 732–737, 596–598; 140/124; 310/156.08
See application file for complete search history.

(56) References Cited

U.S. PATENT DOCUMENTS

| 1,513,031 | A | * | 10/1924 | Brown | 29/259 |
| 4,195,398 | A | * | 4/1980 | Matthews | 29/262 |
| 4,594,771 | A | * | 6/1986 | Appenzeller et al. | 29/596 |
| 4,799,309 | A | * | 1/1989 | Cinzori et al. | 29/596 |
| 5,923,114 | A | * | 7/1999 | Senni | 310/232 |
| 6,012,711 | A | * | 1/2000 | Cipolla | 269/21 |
| 6,640,421 | B2 | * | 11/2003 | Katsuzawa et al. | 29/732 |
| 7,225,525 | B2 | * | 6/2007 | Yamamoto et al. | 29/596 |
| 7,415,758 | B2 | * | 8/2008 | Hauser et al. | 29/736 |
| 7,444,742 | B2 | * | 11/2008 | Sturm et al. | 29/712 |
| 7,523,540 | B2 | * | 4/2009 | Morel | 29/596 |
| 2004/0169434 | A1 | * | 9/2004 | Washington et al. | 310/232 |
| 2005/0246886 | A1 | * | 11/2005 | Morel | 29/596 |
| 2011/0247193 | A1 | * | 10/2011 | Herbold | 29/464 |

* cited by examiner

*Primary Examiner* — Minh Trinh
(74) *Attorney, Agent, or Firm* — Dority & Manning, PA

(57) ABSTRACT

A fixture for removing slip ring assemblies from rotating electrical machinery. The fixture attaches directly to the slip ring assembly through bolted connection points for ease of installation and removal. A jacking mechanism provides mechanical leverage to pry the slip ring from its heat-shrunk fit mounting location in a manner that is reliable and safe for the service worker and the slip ring assembly. The fixture is lightweight and portable, facilitating use with electrical generators in the field and especially with wind turbine generators located on a wind turbine tower.

11 Claims, 6 Drawing Sheets

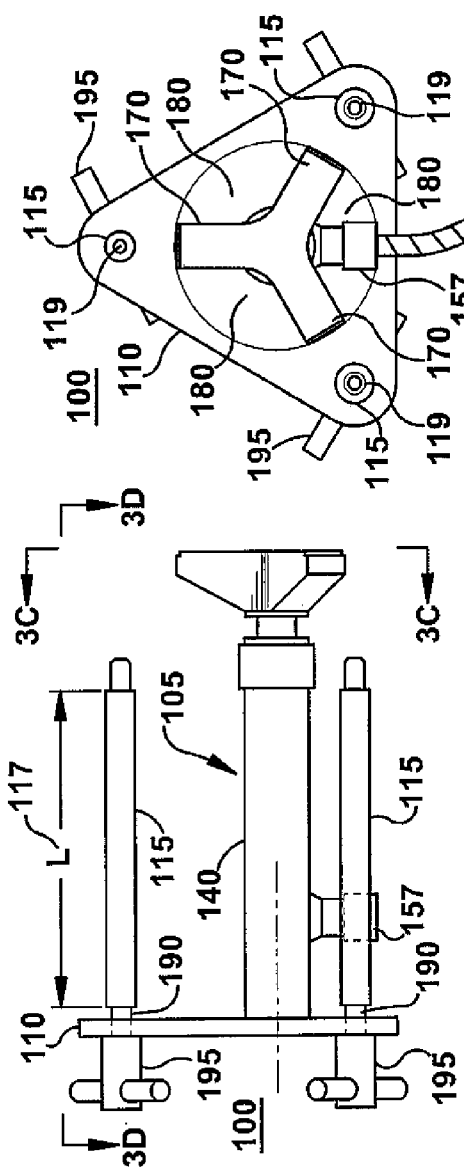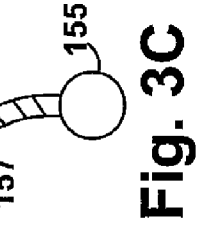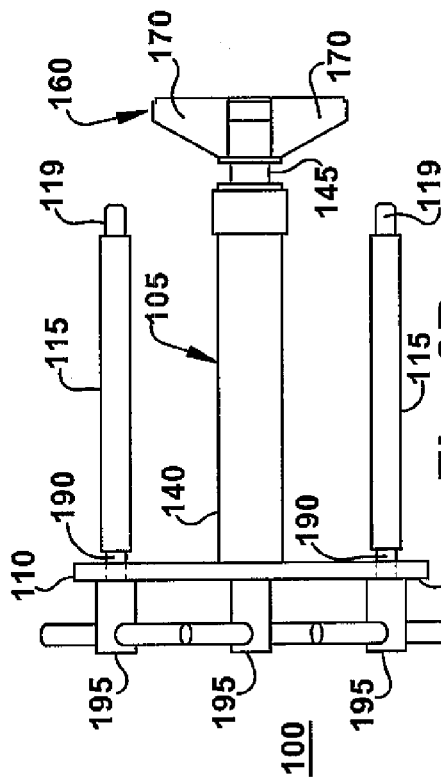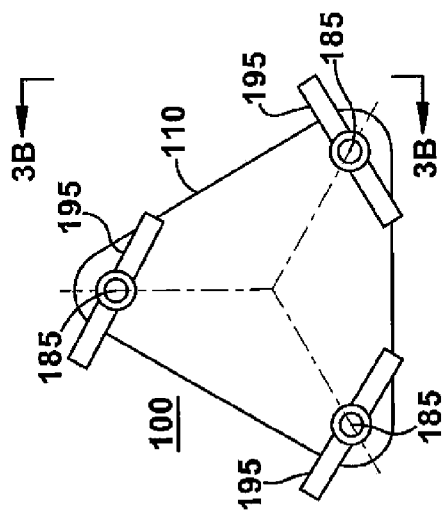

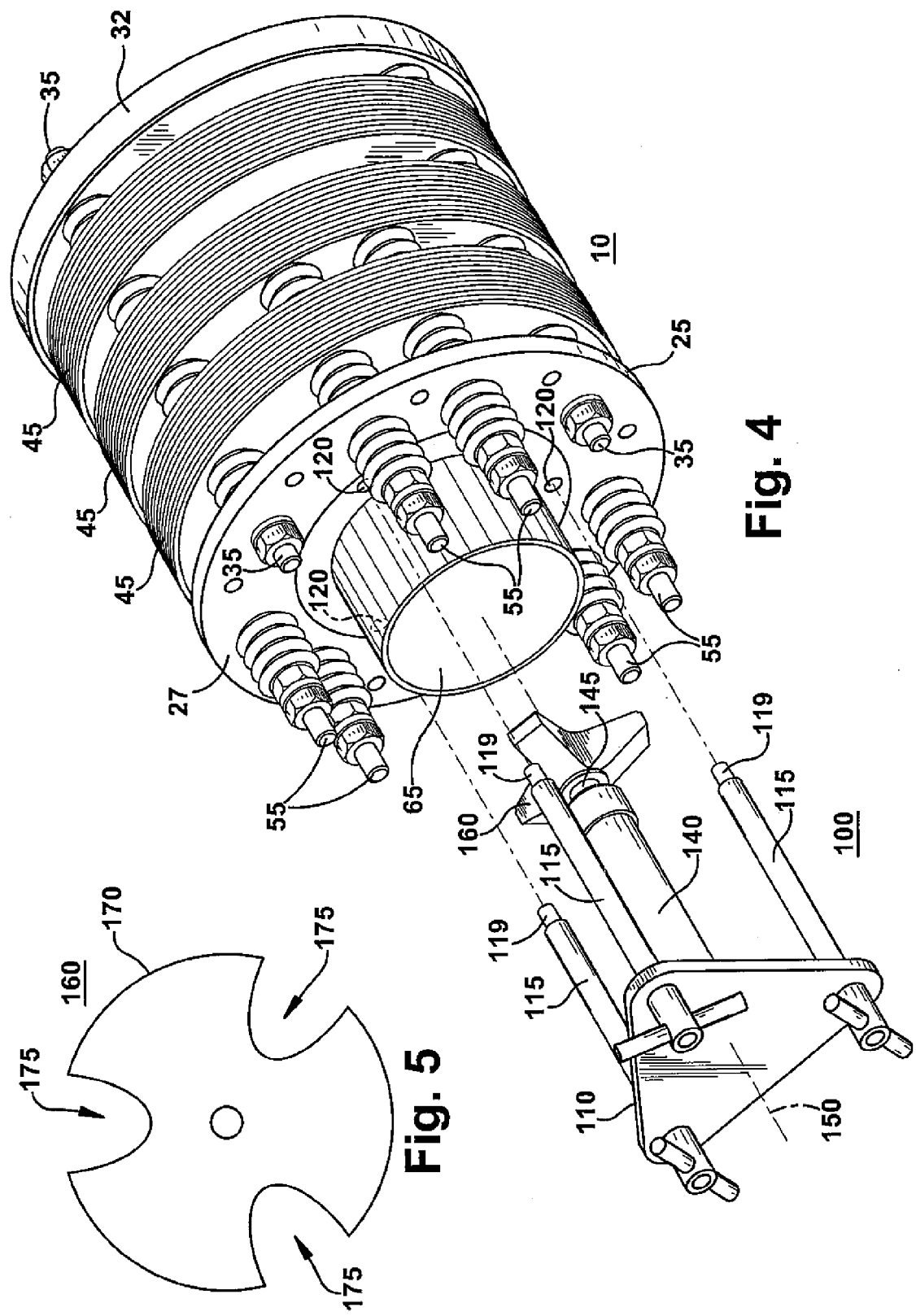

FIXTURE FOR REMOVING SLIP RINGS FROM ROTATING ELECTRICAL MACHINERY

BACKGROUND OF THE INVENTION

The invention relates generally to rotating electrical machinery and more specifically to slip rings for rotating electrical machinery.

Slip rings are employed in a wide range of rotating electrical machinery, such as electric motors and electric generators. A typical alternating current (AC) generator, for example, consists of a stationary stator and a rotor mounted within the stator. The stator includes a specific number of coils, each with a specific number of windings. Similarly, the rotor includes of a specific number of field poles, each with a specific number of windings. In addition to the rotor and stator, a generator has a collector assembly, usually including collector slip rings, brushes and brush holders. The rotor contains magnetic fields that are established and fed by an exciter. When the rotor is rotated, AC is induced in the stator. The changing polarity of the rotor, with respect to the stator, produces the alternating characteristics of the current. The generated voltage is proportional to the strength of the magnetic field, the number of stator coils and the number of windings in each coil, and the speed at which the rotor turns. Slip rings are electrical connections that are used to transfer power to and from the rotor of the AC generator. The slip ring may include a circular conducting material connected to the rotor windings and insulated from the rotor shaft. Brushes ride on the slip ring as the rotor rotates. The brush holder maintains the brushes in place, against the slip ring as the rotor rotates. The exciter supplies the DC current to the magnetic field of the rotor through one set of brushes and slip rings and completes a return path from another set of brushes and slip rings.

A wind turbine generator is a rotating electrical machine that is mechanically coupled to wind turbine blades. The wind turbine generator is positioned in a nacelle at the top of a wind turbine tower. The mechanical energy of the turbine is converted to electrical energy and delivered to a power grid through a collector system. An electronic power converter is used to control the flow of real and reactive power. One common configuration for the wind turbine generator is a doubly fed induction generator with a wound rotor and slip rings. More complex slip ring arrangements are required to convey three-phase ac power to the rotor windings for these types of wind turbine generators.

FIG. 1A and FIG. 1B, respectively, illustrate an end view and a side view for an exemplary slip ring assembly for conveying three phase ac power to the rotor of a wind turbine generator. The slip ring assembly 10 includes an insulated hub 15 with a cylindrical axial cavity 20 for receiving an end shaft of the wind turbine generator rotor. The slip ring assembly 10 includes, relative to the wind turbine generator, an outer end plate 25 and an inner end plate 30 with a ground ring 32. The outer end plate 25 and the inner end plate 30 include a cylindrical axial cavity to accommodate the insulated hub 15. The outer end plate 25, inner end plate 30 and insulated hub 15 are maintained in axial proximity by connection rods 35 threaded and bolted at the plate ends. Insulating pieces 40 surround the connection rods 35 and prevent contact of the connection rods 35 with the electric power in the slip rings. Three annular conductive contact rings 45 (one for each phase of power to the rotor windings) radially surround and are fixed to the slip ring assembly 10. The contact rings 45 provide a contact surface 50 for brushes (not shown) to transfer power to the slip ring assembly 10. The contact ring 45 for an individual phase is physically and electrically in contact with one or more conducting rods 55 for that phase. The conducting rods 55 extend outward through the outer end plate 25 and provide for connection to rotor cables (not shown) at the outer end of the rotor shaft (not shown) from the rotor windings (not shown). Insulating pieces 60 physically separate the contact rings 45 and isolate the conduction path through the conduction rods 55 for an individual phase of power to the rotor windings.

FIG. 2 illustrates electrical connections from the wind turbine generator rotor to the slip ring assembly. The rotor shaft 65 may include a rotor shaft end plate 70. An electrical connection plate 75 is mounted to threaded ends 80 of the conducting rods 55. The electrical connection plate 75 may be constructed of an insulating material to provide for physical connection with the conducting rods 55 for individual rotor phases while providing electrical isolation between the phases. A power cable 85 for each phase of the rotor windings extends from rotor shaft end plate 70. The power cable 85 may be connected to a conducting tab 90 on a phase connecting plate 95 to electrically connect the rotor winding (not shown) through the conducting rods 55 to the associated contact ring 45.

As part of the maintenance process of a wind turbine generator, slip ring assemblies are removed and refurbished to renew their operational capability. Removal of the rotor shaft from inside the hub is difficult since the rotor shaft is provided with heat-shrink fit within the hub. Even when the electrical connection plate is removed from the end of the slip ring assembly, there is no physical access available to pry the slip ring assembly from the generator side. Currently, 90% of these assemblies are damaged upon their removal, as a controlled, non-destructive method is not available. Many of the slip rings, which are damaged during removal for refurbishment, are scrapped because they are beyond repair. The slip rings are damaged by an inefficient removal method as a consistent and repeatable approach has not been employed. This results in increased material cost that is magnified by the hundreds of wind turbines in which this issue occurs. The current slip ring removal method involves hitting the assembly with a hammer. Such blows frequently strike the contact surface resulting in surface damage or strike the porcelain insulators, cracking or totally destroying them. While effective in removing the slip ring assembly, the resulting level of damage is unacceptable. This method is unreliable and also increases risk of personal injury.

Further, difficulty is encountered in removing the slip ring assembly because the wind turbine generator is mounted in the nacelle atop the wind turbine tower, often hundreds of feet above the ground.

Accordingly, there is a need to provide an apparatus and method for efficiently removing slip rings from the rotors for rotating electrical machinery without damaging the slip ring assembly.

BRIEF DESCRIPTION OF THE INVENTION

The present invention relates to a fixture and method for removing a slip ring assembly from the end of rotor shaft of a rotating electrical machine.

Briefly in accordance with one aspect of the present invention, a fixture is provided, adapted for removing a slip ring assembly for a rotating electrical machine from an outer end of a rotor shaft of the rotating electrical machine. The fixture includes a plurality of standoffs adapted to mount the fixture to the slip ring assembly. A jacking assembly is adapted to apply a disengaging force to an outer end of the rotor shaft for the rotating electrical machine. Further, a strongback is provided, adapted to provide back support for the jacking assembly and for the plurality of standoffs.

In accordance with another aspect of the present invention, a method is provided for removing a slip ring assembly from an outer end of a rotor shaft of the rotating electrical machine. The slip ring assembly may include an electrical connection plate and phase conductor and the rotor shaft may include rotor winding cables and an end plate.

The method includes disconnecting electrical connections from the end of the rotor to the slip ring assembly. Interferences are removed. The fixture is first aligned with the slip ring assembly. Then the fixture is attached to the slip ring assembly. The method further includes raising hydraulic pressure on a jacking assembly to release the slip ring assembly from the rotor shaft. When the slip ring assembly is released from the rotor shaft, the fixture is removed from the slip ring assembly.

BRIEF DESCRIPTION OF THE DRAWING

These and other features, aspects, and advantages of the present invention will become better understood when the following detailed description is read with reference to the accompanying drawings in which like characters represent like parts throughout the drawings, wherein:

FIGS. 3A, 3B, 3C and 3D, respectively illustrate a top end view, a side view, a bottom end view and a top view for a first embodiment of the inventive fixture for slip ring assembly removal;

FIG. 4 illustrates the first embodiment of the inventive fixture with central axis 150 centered on the end of the rotor shaft of the slip ring assembly;

FIG. 5 illustrates an alternate embodiment for the end block of the jacking assembly;

DETAILED DESCRIPTION OF THE INVENTION

Figures 1A, 1B:
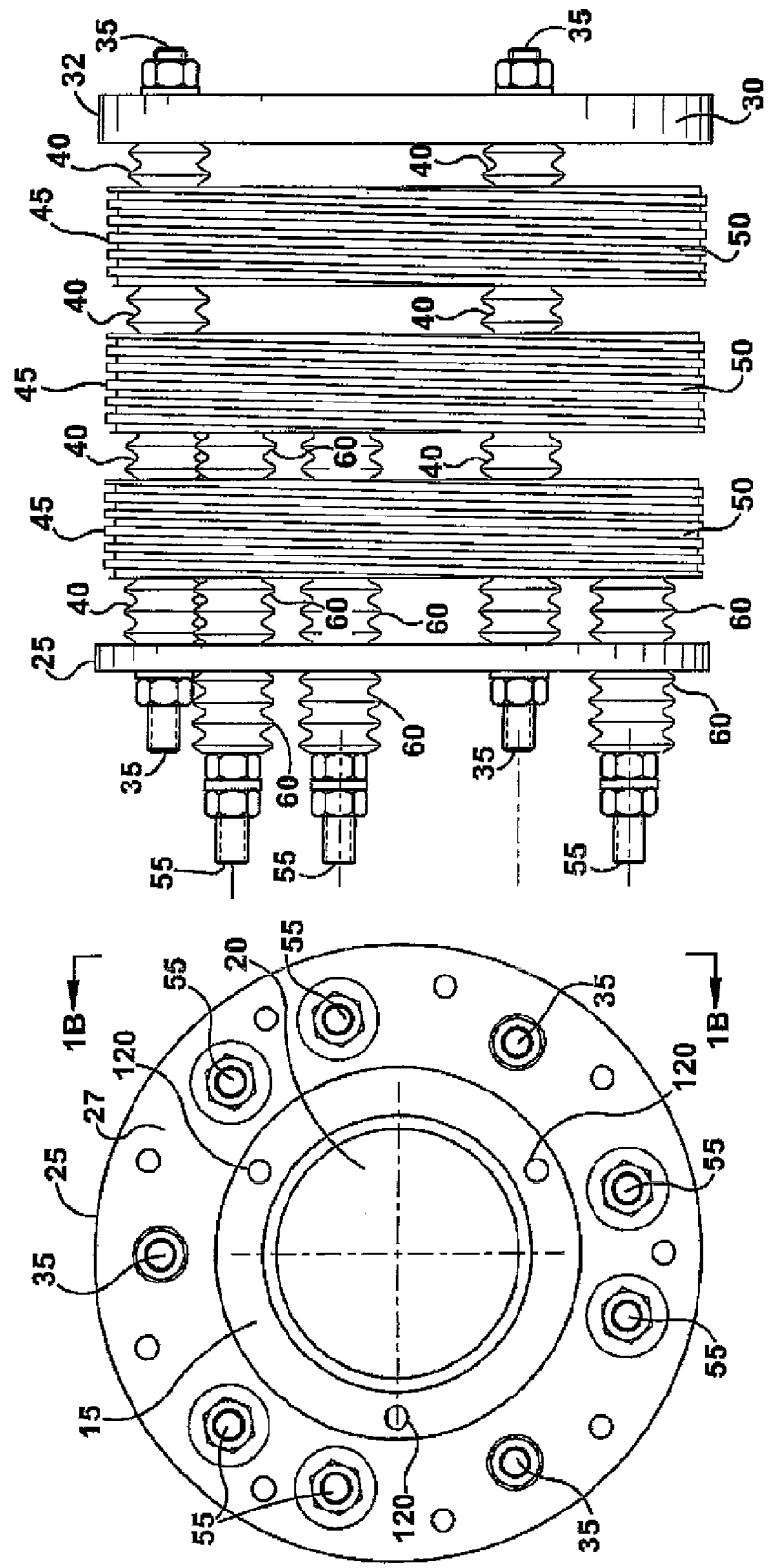
FIGS. 1A and 1B, respectively, illustrate an end view and a side view of a slip ring assembly for conveying three phase ac power to the rotor of a wind turbine generator.
Figure 2:
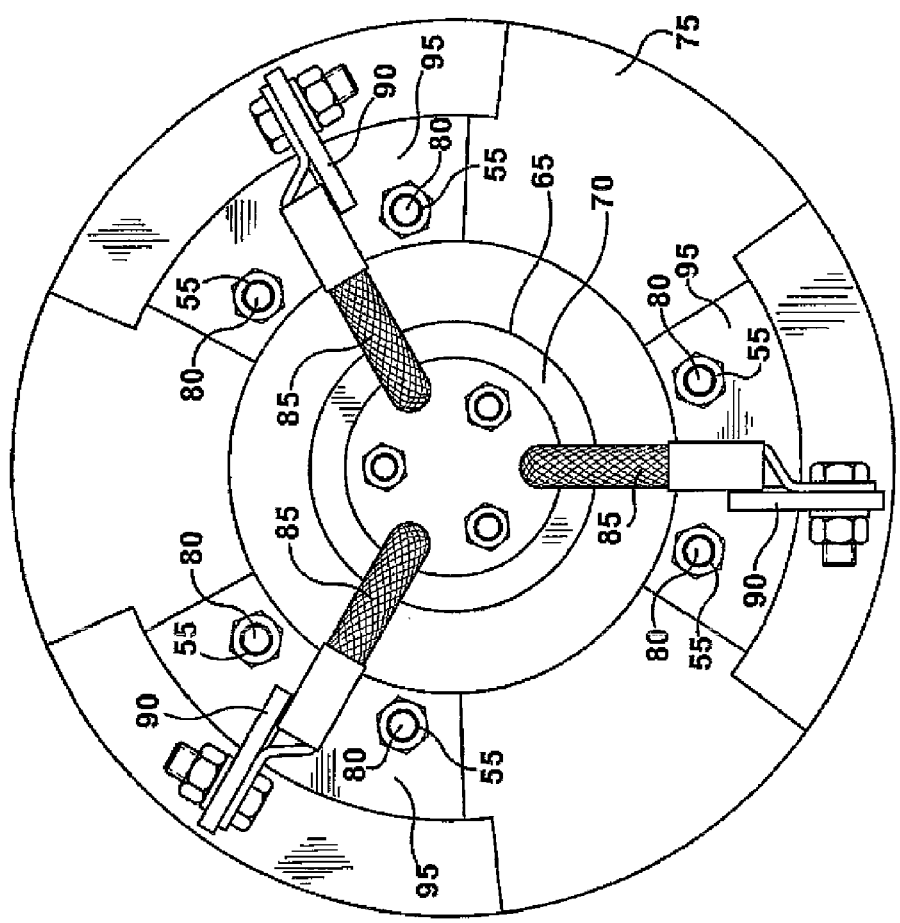
FIG. 2 illustrates electrical connections from the wind turbine generator rotor to the slip ring assembly.

The following embodiments of the present invention have many advantages, including providing a lightweight slip ring removal tool that permits removal of a slip ring assembly from rotating electrical machinery without damaging the slip ring, as experienced with previous slip ring removal methods.

The slip ring removal tool (fixture) may incorporate common, lightweight materials to effectively remove the slip ring assembly. The inventive fixture may allow removal of slip rings from a variety of rotating electrical machinery, including electric motors and electric generators, although the present embodiment of the fixture is adapted for removal of a slip ring assembly from a wind turbine generator.

This present invention greatly minimizes damage incurred during removal, and provides the service engineer with a safe and simple alternative. Mechanical leverage is generated through a jacking assembly to effectively overcome the heat-shrink fit and remove the slip ring with minimal damage and reduced operator effort. The apparatus is mobile enough to be easily lifted by the turbine's winch system, and versatile and lightweight such that a single operator can install, operate, and remove the entire system.

The slip ring removal fixture provides cost savings in both material and manpower and a process improvement. The fixture significantly reduces the effort and time required for removing the slip rings.

In one embodiment of the present invention, the apparatus attaches directly to the slip ring assembly through three bolted connection points for ease of installation and removal. A jacking mechanism provides mechanical leverage to ply the slip ring from its heat-shrunk fit mounting location in a manner that is reliable and safe for the service worker and the slip ring assembly. This tool greatly decreases the number of slip rings damaged during this process and allows the vendor to properly refurbish and reuse these critical components.

The jacking mechanism may include a pneumatic jack, a hydraulic jack or an electric jack. A bottle-type jack, due to its cylindrical and elongated shape, may be advantageous in easily fitting along a central axis of the fixture and aligning with the end of the rotor shaft of the ac generator.

A second embodiment may eliminate the bottle jack and implement a solid piece of steel tube instead. Then, the nuts may be tightened in succession to slowly remove the slip ring from the generator. This process would be more time consuming, but would eliminate the added expense and weight of the bottle jack.

FIGS. 3A, 3B, 3C and 3D illustrate a top end view, a side view, a bottom end view, and a top view for a first embodiment of the slip ring removal fixture 100. A jacking assembly 105 is rear mounted to a strongback 110, by convenient means known in the art. The strongback 110 may comprise a metal plate, preferably of strong, but lightweight metal, such as but not limited to aluminum. Standoffs 115 are also rear mounted to the strongback 110. The standoffs 115 may also include a strong, but lightweight, metal tubing such as but not limited to aluminum. Other materials such as steel may be preferred. The standoffs 115 may include means for fastening the fixture to corresponding receiving points 120 on the outer face 27 of the outer end plate 25 of the slip ring assembly. The means may include threaded ends 119 adapted to mate with threaded boltholes on the outer face 27 of the outer end plate 25. The standoffs 115 and the corresponding receiving points 120 may be symmetrically and circumferentially spaced around the outer face 27 of the outer end plate 25. A length 117 of the standoff 115 establishes a distance between the strongback 110 and the outer end plate 25 of the slip ring assembly 10.

The jacking assembly 105 is adapted to apply a disengaging force to an outer end of the rotor shaft for a wind turbine generator. The jacking assembly 105 includes a jack 140, which may include a hydraulic jack, a pneumatic jack, or an electric powered jack. The jack 140 may be a bottle jack, which is relatively light and where the bottle-shape is particularly shaped to be placed along the center of the fixture. A light-weight and compact fixture is especially desirable for removing the slip ring assembly from the rotor shaft on a wind turbine generator.

An operating piston 145 of the jack 140 may be centered along a central axis 150 of the fixture 100. An outside pressure source 155, conveniently located in proximity to the jack 140 may provide pressure to connection 157 to the jack 140. When pressure is applied to the jack 140, the operating piston 145 moves along the central axis 150 in a direction away from the strongback 110.

The jacking assembly 105 may also include: an end block 160 situated at an outer end of the operating piston 145. The end block 160 is adapted to engage the outer end of the rotor shaft 65 of the wind turbine generator. The length 117 of the standoffs 115 may also result in positioning the end block 160 in close proximity to the outer end of the rotor, when the fixture is mounted on the slip ring assembly 10, such that the stroke of the operating piston 145 will engage and provide sufficient force against the outer end of the rotor shaft 165 to cause a release of the slip ring assembly 10.

The end block 160 may comprise a body, mechanically attached to an outer end 147 of the operating piston 145 by means known in the art. The end block 160 may also include a plurality of arms 170 extending radially and axially from the central axis 150 of the fixture 100 configured with cutouts 180 providing a radial-circumferential space between each of the plurality of arms 170. The cutouts 180 may be sized to avoid interference with a plurality of rotor windings cables 85 extending from an end surface of the outer end of the rotor shaft 65 of the rotating electrical machine.

The fixture 100 may further include a threaded upper stem 185 on the standoffs 115, passing through threaded axial holes 190 in the strongback 110. Tee operators 195 or other suitable devices may be mounted to the upper stem 185 to facilitate threading of the standoffs 115 onto the corresponding receiving points 120 of the slip ring assembly.

FIG. 4 illustrates the fixture 100 lined up for mounting onto the slip ring assembly 10 of a rotating electrical machine 5. The central axis 150 of the fixture 100 is centered on the end of the rotor shaft 65 of the slip ring assembly 10. Threaded ends 119 of standoffs 115 are also lined up with threaded receiving points 120 on the outer face 27 of outer end plate 25 of the slip ring assembly 10. End block 160 is lined up to apply force from jack 140 to the rotor shaft 65 of the slip ring assembly 10 of the rotating electrical machine.

FIG. 5 illustrates an alternate embodiment for the end block of the jacking assembly. The end block 160 may include a plate-shaped end block 170 to engage the outer end of the rotor shaft 65 of the wind turbine generator. The plate-shaped end block 170 may be provided with a plurality of radial cutouts 175 to avoid interference with a plurality of rotor windings cables 85 extending from an end surface of the outer end of the rotor shaft 65 of a wind turbine generator.

Figure 6:
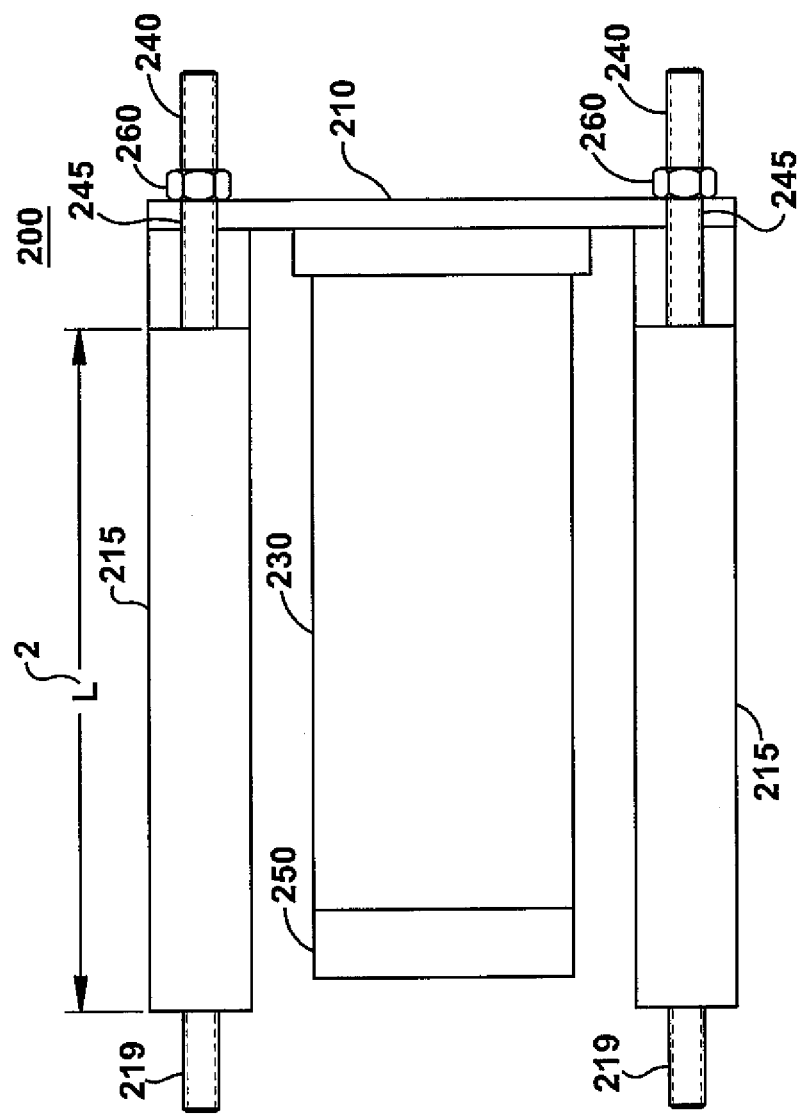
FIG. 6 illustrates another embodiment of the present invention.

FIG. 6 illustrates another embodiment of the present invention. The fixture 200 may include a strongback 210, a solid block 230 supported at the rear by the strongback 210, and standoffs 215. The standoffs 215 have a length L 235 to establish placement for an end face 250 of the solid block 230, when positioned on a slip ring assembly (not shown). Threaded ends 219 screw into receiving points on outer face of outer plate of the slip ring assembly (not shown). The end face 250 may include a solid block of metal with cutouts or may include axial-radial arms, both as previously described to avoid interferences at the end of the rotor. Upper threads 240 of the standoffs pass through axial holes 245 in the strongback 210. Operation of threaded bolts 260 will cause end threads 219 to engage receiving points in the outer end plate of the slip ring assembly until the end threads bottom out. Continued operation of the threaded bolts will cause end face 250 of the solid block 230 to engage and push the end of the rotor shaft (not shown) until the slip ring assembly breaks free.

Figure 7:
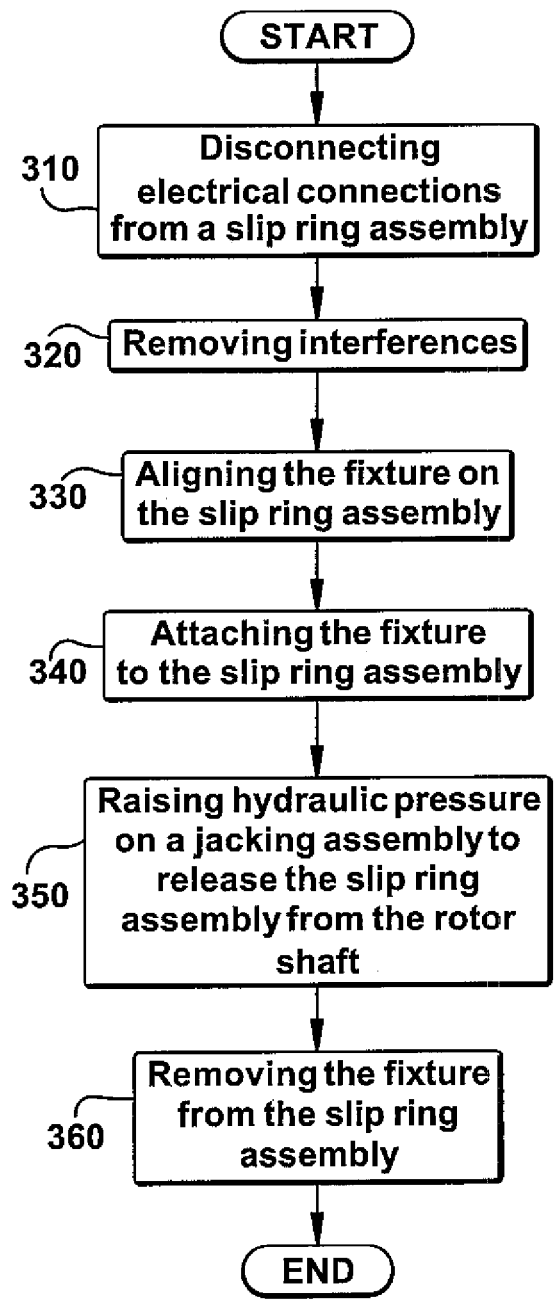
FIG. 7 illustrates a flowchart for a method of removing a slip ring assembly from the rotor shaft end of a generator using an embodiment of inventive fixture.

FIG. 7 illustrates a flowchart for a method of removing a slip ring assembly from the exciter end of a rotating electrical machine using an embodiment of inventive fixture. The procedure addresses a slip ring assembly, which may include an electrical connection plate and phase conductor, and a rotor shaft that may include rotor winding cables and an end plate.

In step 310, electrical connections to the slip ring assembly are disconnected. Disconnection may include disconnecting the rotor winding cabling from an electrical connection plate of a slip ring assembly, in preparation for removing an electrical connection plate for the rotor winding cable. However, the disconnection step may also include disconnecting any electrical connections to the slip ring assembly, that are required for removal of the slip ring assembly from the shaft for the specific piece of rotating electrical machinery. In step 320, various interferences at the end of the slip ring assembly may be removed. Such inteferences comprise any structures or components at the end of slip ring assembly or rotor shaft that may prevent or hinder mounting or operation of the fixture, and may include the electrical connection plate, for example. The electrical connection plate may require unbolting from the conduction rod ends on the slip ring assembly. In step 330, the fixture is aligned with the slip ring assembly. The alignment step may include positioning the ends of the standoffs in proximity to receiving points on the outer end plate of the slip ring assembly. In one embodiment of the inventive fixture, the receiving points on the outer face of outer end plate may include threaded boltholes for receiving threads at the end of the associated standoffs. In step 340, the fixture is attached to the slip ring assembly. Attaching may include threading ends of a plurality of standoffs into the corresponding threaded holes in an end plate of the slip ring assembly.

Hydraulic pressure is raised on the jacking assembly in step 350 to release the slip ring assembly from the rotor shaft. A predetermined limit may be set on the pressure applied to the jacking assembly in order to limit forces and preclude damage to the slip ring assembly and the fixture, as well as to ensure personnel safety. In step 360, the fixture is removed from the released slip ring assembly.

While various embodiments are described herein, it will be appreciated from the specification that various combinations of elements, variations or improvements therein may be made, and are within the scope of the invention.

The invention claimed is:

1. A fixture adapted for removing a slip ring assembly for a rotating electrical machine from an outer end of a rotor shaft of the rotating electrical machine; comprising:

a plurality of standoffs adapted to mount the fixture to the slip ring assembly;

a jacking assembly adapted to apply a disengaging force to an outer end plate of the rotor shaft of the rotating electrical machine;

a strongback adapted to provide back support for said jacking assembly and for said standoffs, wherein said plurality of standoffs are adapted to fixedly engage the outer end plate of the slip ring assembly and fixedly engage said strongback to maintain a fixed distance between said strongback and the outer end plate of the slip ring assembly at all times;

wherein said plurality of standoffs are symmetrically distributed circumferentially between said strongback and the outer end plate of the slip ring assembly; and wherein said plurality of standoffs include end threads to engage corresponding threaded holes on an outer face of the outer end plate of the slip ring assembly.

2. The fixture adapted for removing a slip ring assembly according to claim 1, wherein said strongback includes a plurality of threaded axial holes to engage a corresponding plurality of threaded axial sections of said standoffs and wherein said standoffs include turning means to facilitate threading said end threads into the outer face of the end plate of the slip ring assembly.

3. The fixture adapted for removing a slip ring assembly according to claim 1, wherein said jacking assembly adapted to apply a disengaging force to an outer end of the rotor shaft for a rotating electrical machine according to claim 1, comprises:

at least one of a hydraulic jack, a pneumatic jack, or an electric powered jack wherein an operating piston of said jack is centered along a central axis of the fixture and wherein said piston moves along said central axis in a direction away from said strongback.

4. The fixture adapted for removing a slip ring assembly according to claim 3, wherein said jacking assembly comprises: a bottle jack.

5. The fixture adapted for removing a slip ring assembly according to claim 3, further comprising: an end block at an outer end of said piston, wherein said end block is adapted to engage the outer end of the rotor shaft of the rotating electrical machine.

6. The fixture adapted for removing a slip ring assembly according to claim 5, said end block comprising: a plate shaped to engage the outer end of the rotor shaft of the rotating electrical machine, including a plurality of cutouts to avoid interference with a plurality of rotor windings cables extending from an end surface of the outer end of the rotor shaft of the rotating electrical machine.

7. The fixture adapted for removing a slip ring assembly according to claim 5, said end block comprising:
a body; and
a plurality of arms extending radially and axially from said central axis of the fixture configured with a radial space between said plurality of arms to avoid interference with a plurality of rotor windings cables extending from an end surface of the outer end of the rotor shaft of the rotating electrical machine.

8. A fixture adapted for removing a slip ring assembly for a rotating electrical machine from an outer end of a rotor shaft of the rotating electrical machine, comprising:
a plurality of standoffs adapted to mount the fixture to the slip ring assembly;
a jacking assembly adapted to apply a disengaging force to an outer end plate of the rotor shaft of the rotating electrical machine;
a strongback adapted to provide back support for the said jacking assembly and for the said standoffs, wherein said plurality of standoffs are adapted to fixedly engage the outer end plate of the slip ring assembly and fixedly engage said strongback to maintain a predetermined separation between said strongback and the outer end plate of the slip ring assembly; and
end threads on said plurality of standoffs to engage corresponding threaded holes on an outer face of the outer end plate of the slip ring assembly.

9. The fixture as in claim 8, wherein said strongback includes a plurality of threaded axial holes to engage a corresponding plurality of threaded axial sections of said standoffs and wherein said standoffs include turning means to facilitate threading said threaded end threads into the outer face of the end plate of the slip ring assembly.

10. A fixture adapted for removing a slip ring assembly for a rotating electrical machine from an outer end of a rotor shaft of the rotating electrical machine, comprising:
a plurality of standoffs adapted to mount the fixture to the slip ring assembly;
a jacking assembly adapted to apply a disengaging force to an outer end plate of the rotor shaft of the rotating electrical machine, wherein said jacking assembly is at least one of a hydraulic jack, a pneumatic jack, or an electric powered jack;
a strongback adapted to provide back support for the said jacking assembly and for the said standoffs, wherein said plurality of standoffs are adapted to fixedly engage the outer end plate of the slip ring assembly and fixedly engage said strongback to maintain a predetermined separation between said strongback and the outer end plate of the slip ring assembly; and
an operating piston of said jacking assembly centered along a central axis of the fixture, wherein said operating piston moves along said central axis in a direction away from said strongback.

11. The fixture as in claim 10, further comprising an end block at an outer end of said operating piston, wherein said end block is adapted to engage the outer end of the rotor shaft of the rotating electrical machine.

* * * * *